Sept. 1, 1970  H. E. TEMPLE  3,526,325
APPARATUS FOR HANDLING BAKERY PRODUCTS
Original Filed Dec. 23, 1963  11 Sheets-Sheet 1

INVENTOR.
HIRAM E. TEMPLE
BY
Learman, Learman & McCulloch
ATTORNEYS

INVENTOR.
HIRAM E. TEMPLE
BY
Learman, Learman & McCulloch
ATTORNEYS

INVENTOR
HIRAM E. TEMPLE
BY
Learman, Learman & McCulloch
ATTORNEYS

Sept. 1, 1970          H. E. TEMPLE          3,526,325

APPARATUS FOR HANDLING BAKERY PRODUCTS

Original Filed Dec. 23, 1963          11 Sheets-Sheet 5

INVENTOR.
HIRAM E. TEMPLE
BY
Learman, Learman & McCulloch
ATTORNEYS

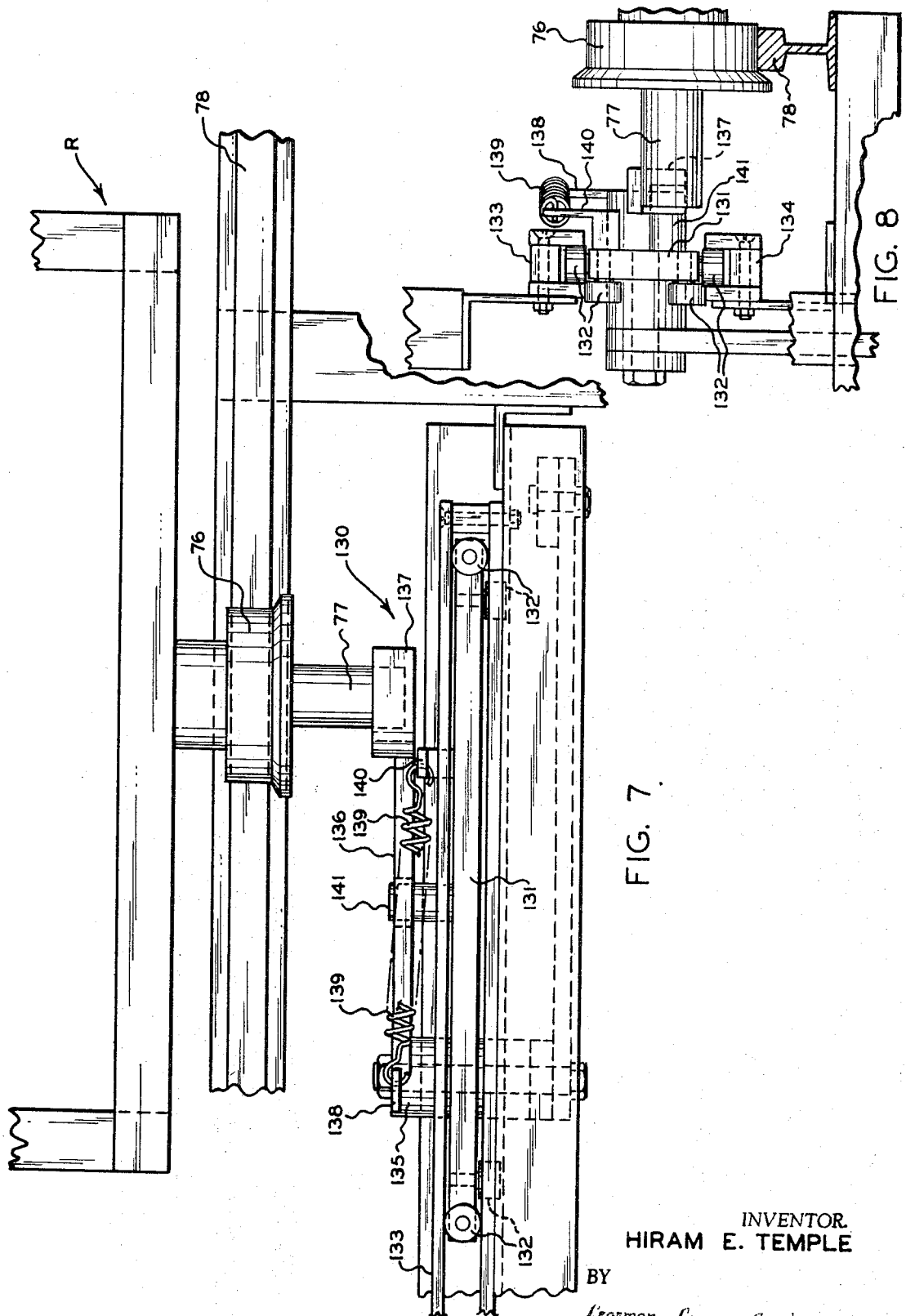

INVENTOR.
HIRAM E. TEMPLE

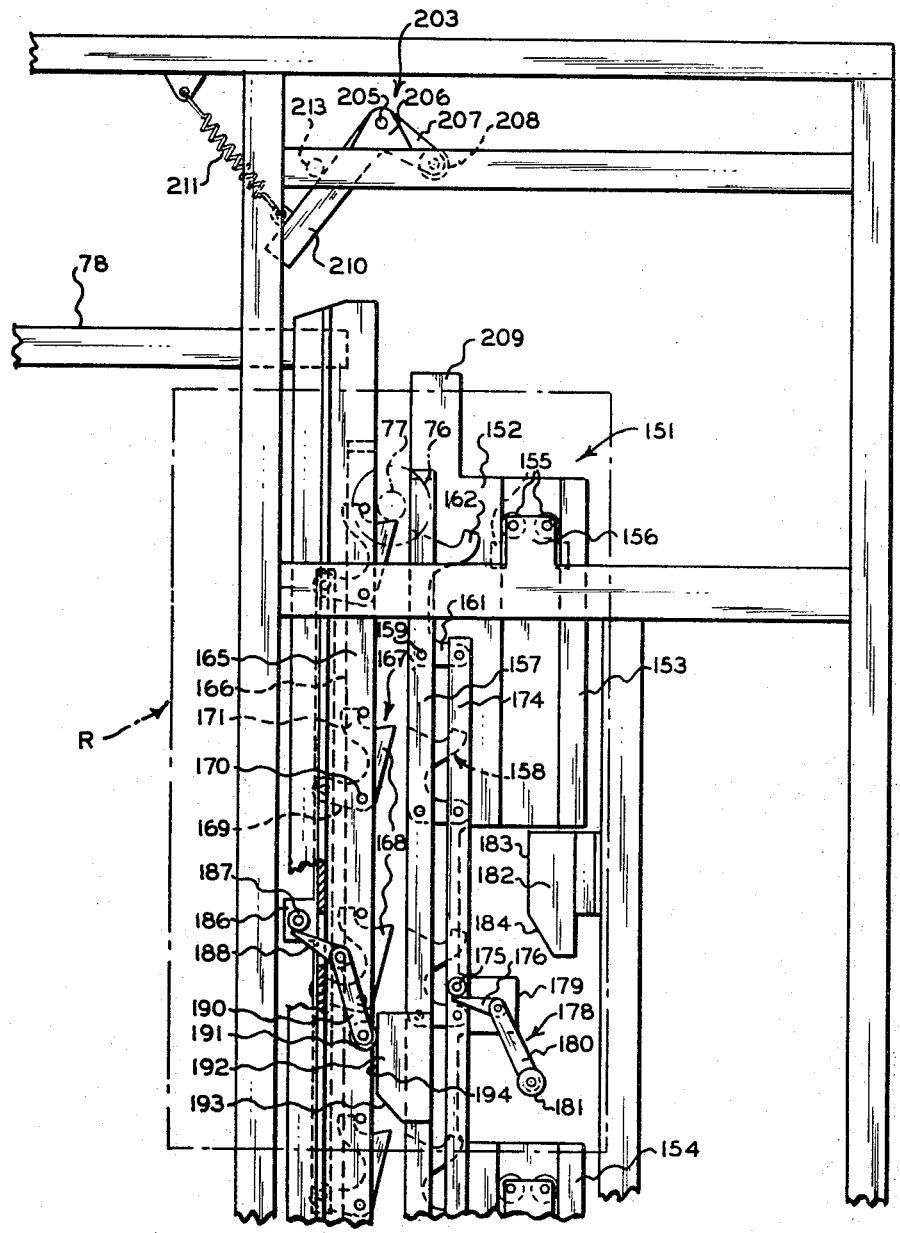
FIG. 9-A

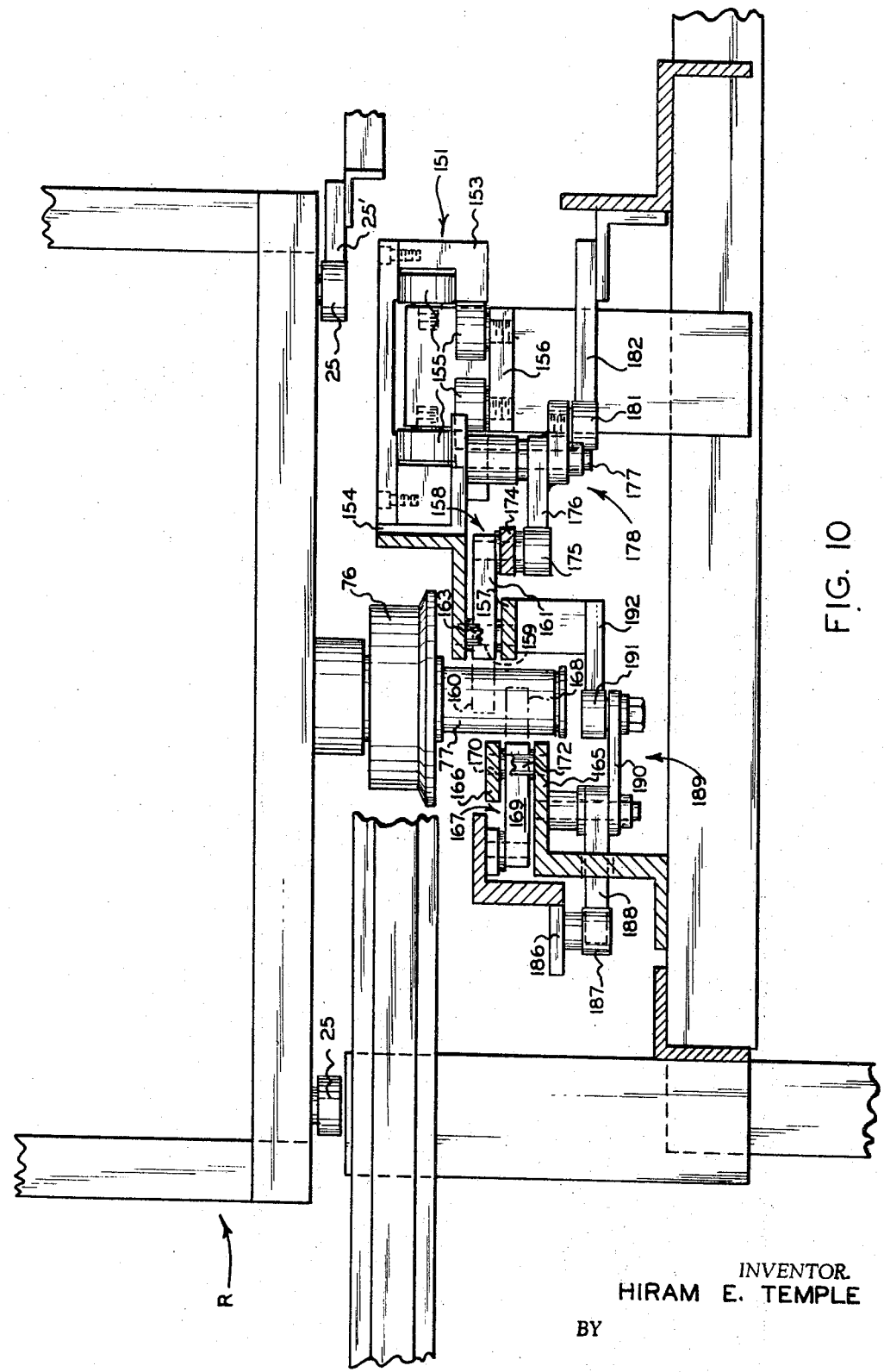

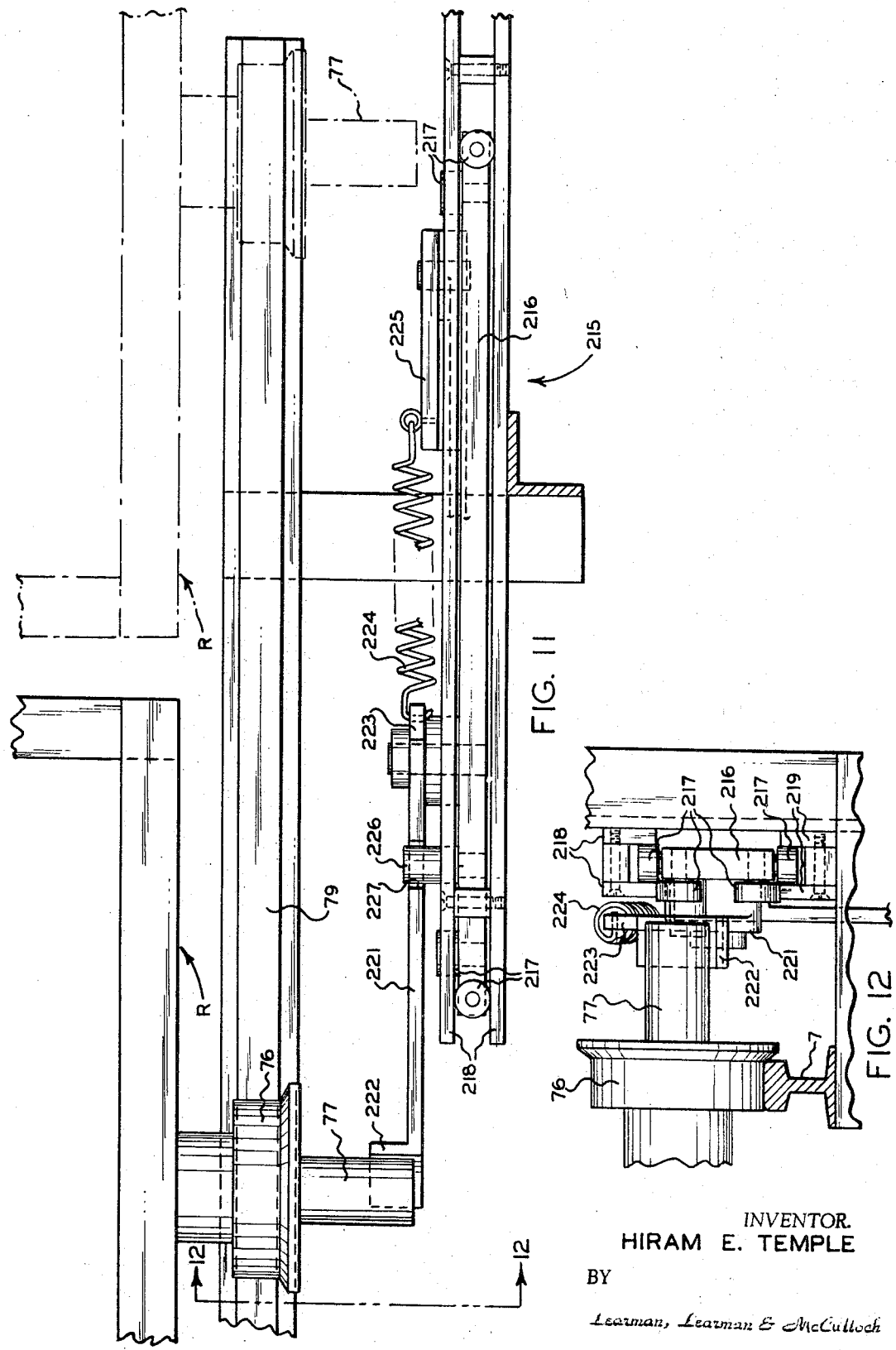

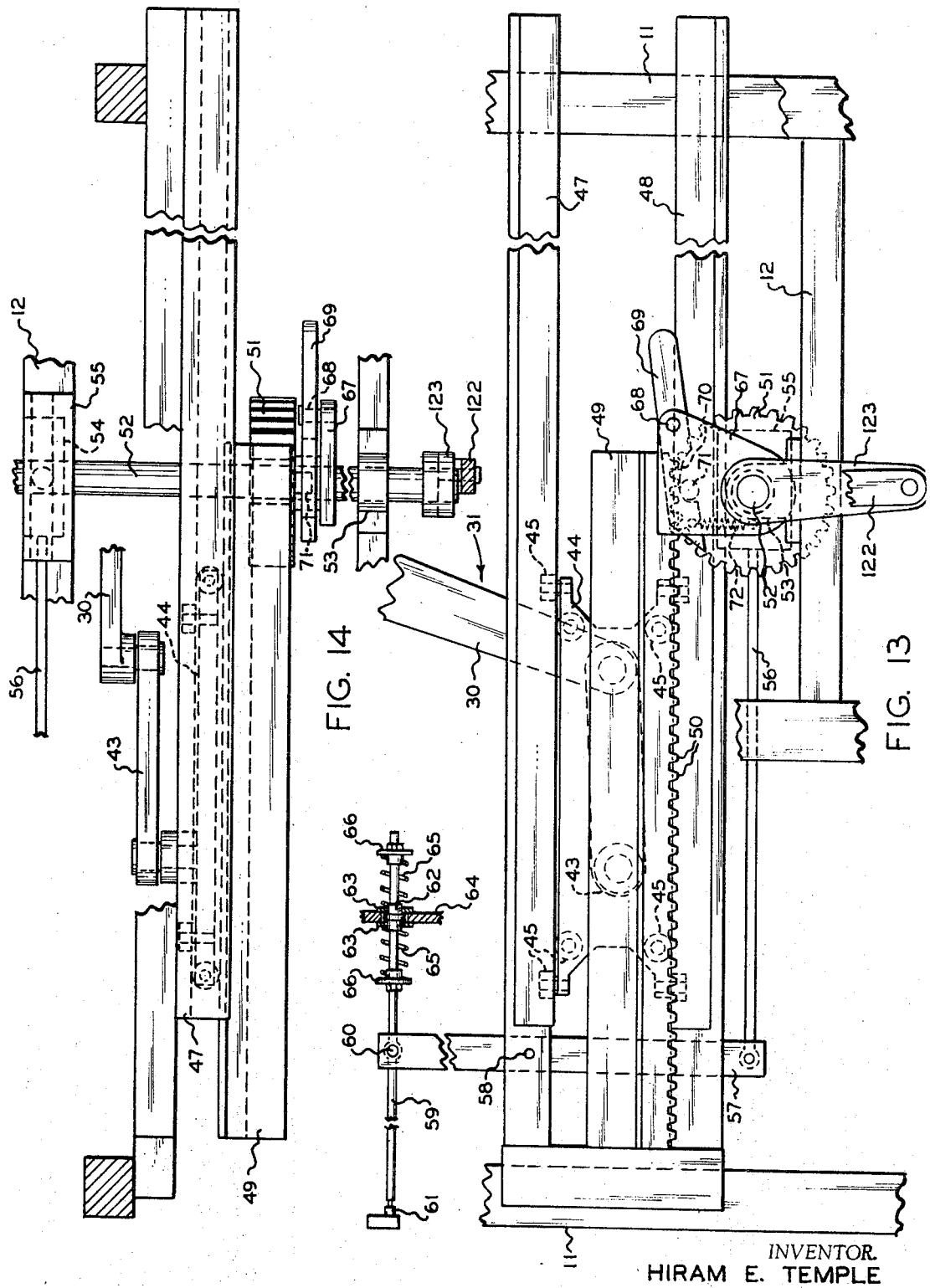

United States Patent Office

3,526,325
Patented Sept. 1, 1970

3,526,325
APPARATUS FOR HANDLING BAKERY
PRODUCTS
Hiram E. Temple, Saginaw, Mich., assignor to Baker Perkins Inc., Saginaw, Mich., a corporation of New York
Original application Dec. 23, 1963, Ser. No. 332,813, now Patent No. 3,319,806, dated May 16, 1967. Divided and this application Nov. 14, 1966, Ser. No. 593,777
The portion of the term of the patent subsequent to May 16, 1984, has been disclaimed
Int. Cl. B65g 65/02
U.S. Cl. 214—16.4                     12 Claims

ABSTRACT OF THE DISCLOSURE

An apparatus such as bakery proofers, coolers, and the like which are adapted to transport bakery products along a path from a loading station to an unloading station. More specifically, the invention relates to apparatus of this character which is adapted to facilitate the loading of racks with bakery products, the conducting of the racks containing the products along the path through a treating zone, and the unloading of the backery products after they have been conducted through the zone.

---

This application is a division of application, Ser. No. 332,813, filed Dec. 23, 1963, now Pat. No. 3,319,806.

This invention relates to apparatus such as bakery proofers, coolers, and the like which are adapted to transport bakery products along a path from a loading station to an unloading station. More specifically, the invention relates to apparatus of this character which is adapted to facilitate the loading of racks with bakery products, the conducting of the racks containing the products along the path through a treating zone, and the unloading of the bakery products after they have been conducted through the zone.

An object of the invention is to provide bakery equipment which is simplified in design and less expensive to produce and maintain than previously known apparatus adapted for similar purposes.

Another object of the invention is to provide bakery product handling apparatus which eliminates or minimizes the necessity of using roller chains, thereby avoiding or minimizing the problems of chain stretching and rusting or seizing of the chain rollers or pivots.

A further object of the invention is to provide apparatus of the character referred to that is capable of being operated by continuously running drive means, thereby eliminating the necessity of providing complex and expensive timing or synchronizing mechanisms.

Another object of the invention is to provide apparatus of the kind described which is operable by a single driving motor, thereby greatly simplifying the electrical and other control mechanisms usually associated with multiple motor driving mechanisms.

A further object of the invention is to provide apparatus for conducting racks through a closed path having vertical and horizontal components and in which the racks are held more nearly level at all times to avoid shifting of articles on the shelves.

A further object of the invention is to provide apparatus of the character described in which all movements of the product supporting racks are initiated and terminated gradually so as to avoid subjecting products supported by the racks to jars and sudden movements.

Another object of the invention is to provide in apparatus of the kind referred to mechanism for maintaining product supporting shelves in exact alignment with the product loading and unloading devices so as to prevent damaging the product and the creation of jams due to misalignment, even should the shelves become bent.

A further object of the invention is to provide improved means for effecting transfer of a product supporting rack from or to a vertical path of travel to or from a horizontal path of travel.

Another object of the invention is to provide improved means for elevating and lowering a product step by step in a vertical path.

Other objects and advantages of the invention will be pointed out specifically or will become apparent from the following description when it is considered in conjunction with the appended claims and the accompanying drawings, in which:

FIG. 7 is an enlarged sectional view of a transfer device and taken on the line 7—7 of FIG. 5;

Figure 1:
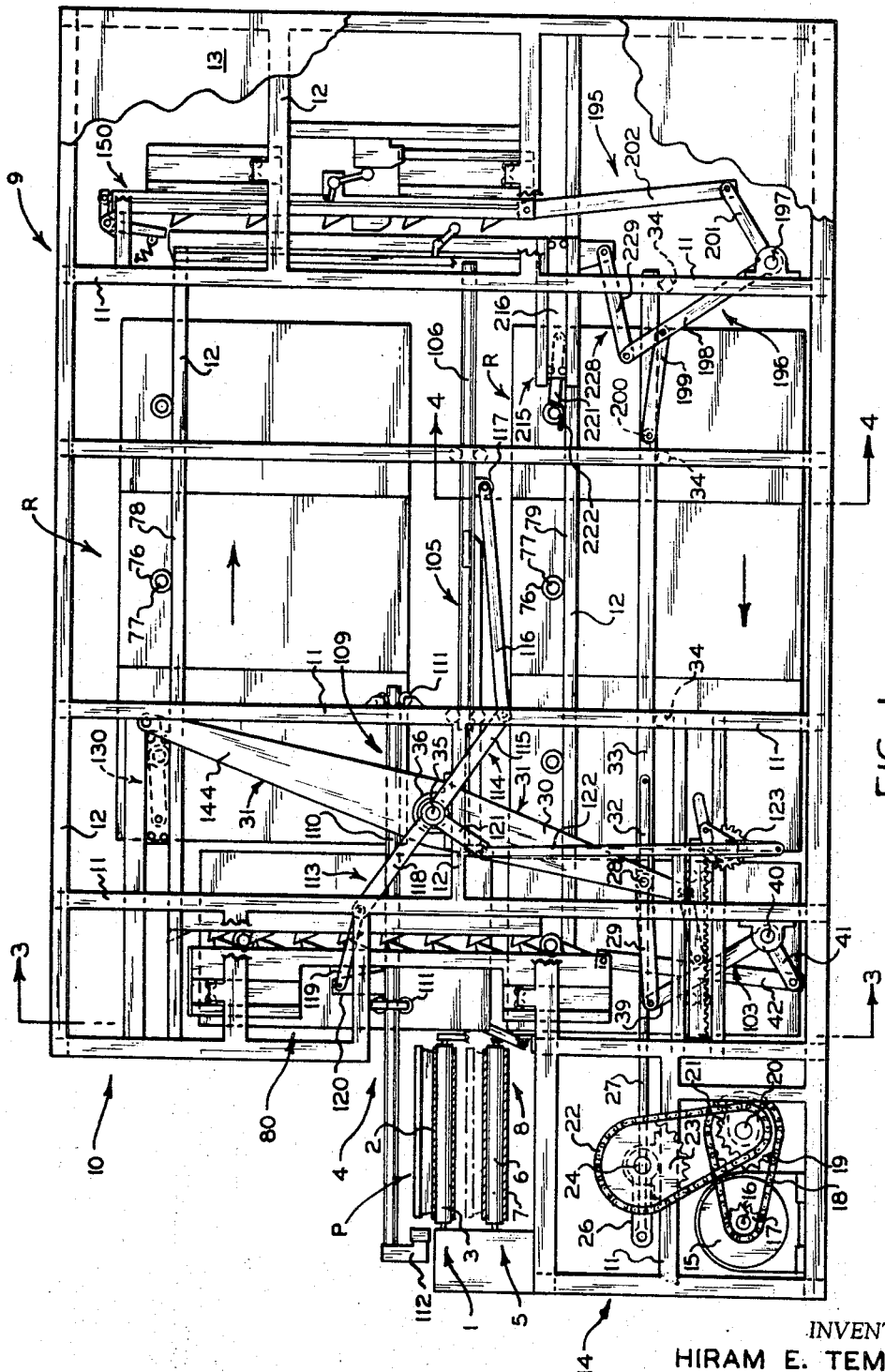
FIG. 1 is a side elevational view of a proofer or cooler constructed in accordance with the invention, the walls of the housing and certain parts of the frame being broken away for purposes of clarification.
Figure 5:
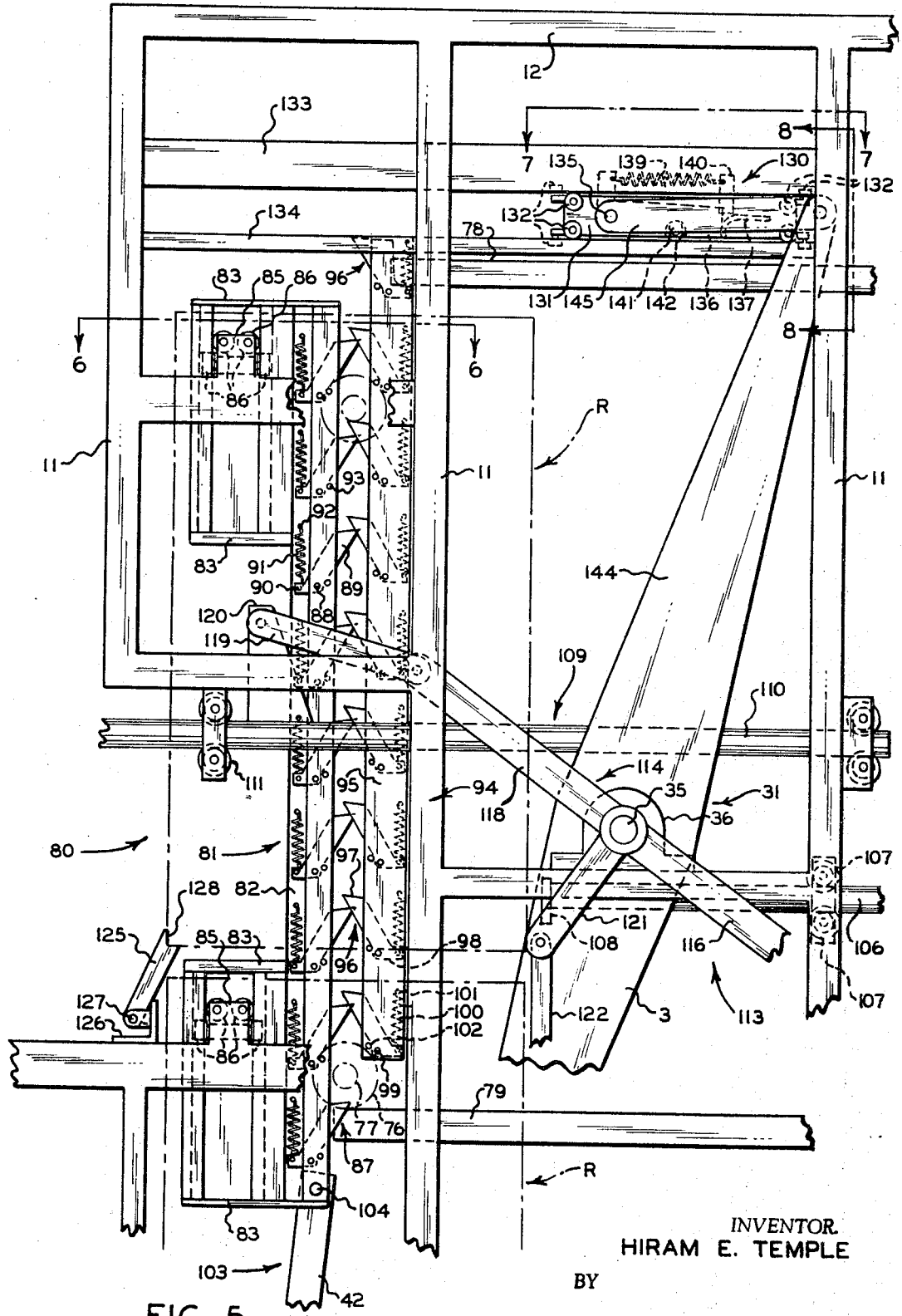
FIG. 5 is a fragmentary, enlarged view of the elevator mechanism illustrated adjacent the left-hand end of FIG. 1.
Figure 9:
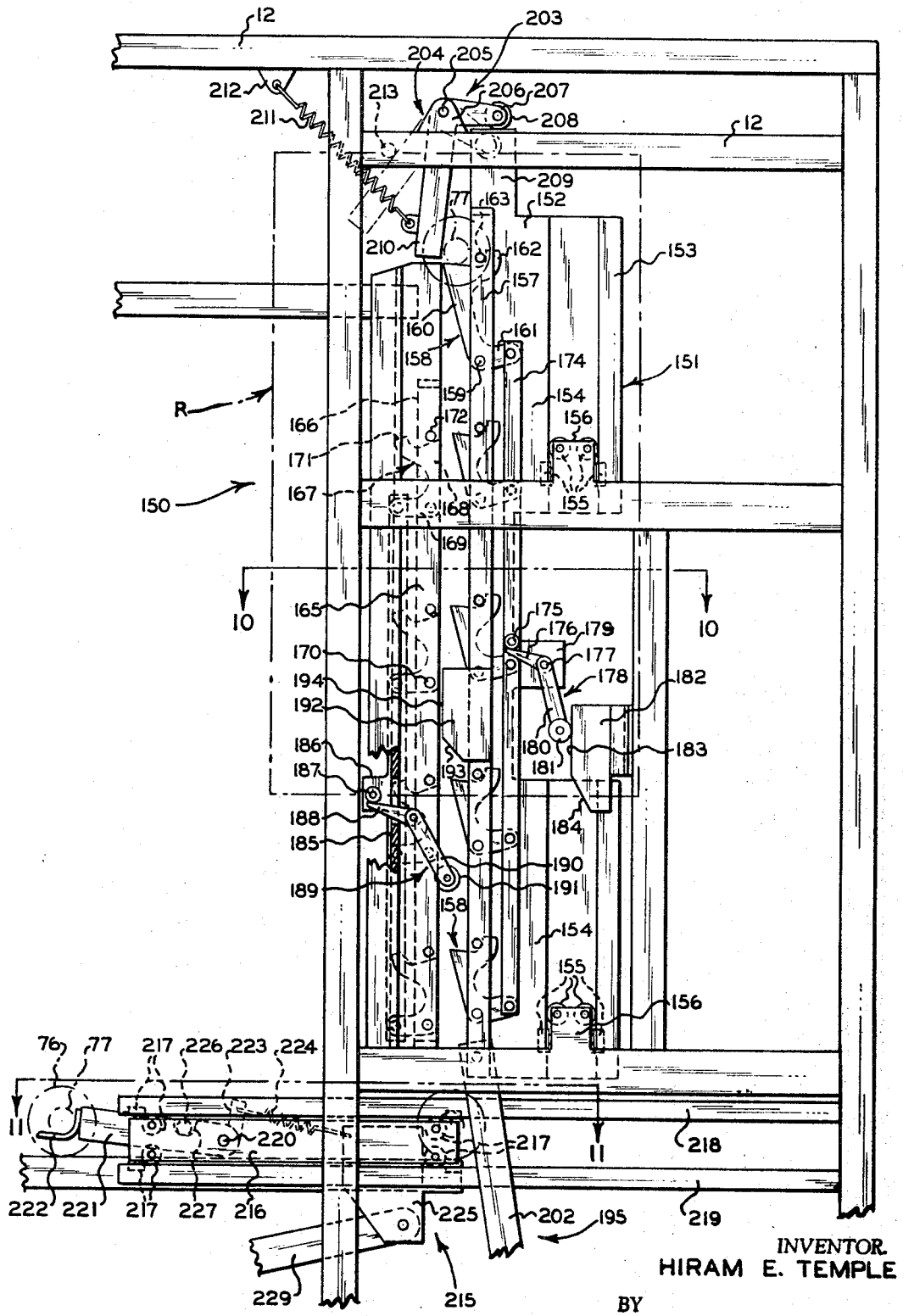

FIG. 8 also is an enlarged sectional view of the transfer device, but taken on the line 8—8 of FIG. 5;

FIG. 9 is a fragmentary, enlarged view partly in side elevation and partly in section of lowerator mechanism shown adjacent the right-hand end of FIG. 1;

FIG. 9A is a fragmentary view similar to FIG. 9, but showing the mechanism in an adjusted position;

FIG. 10 is an enlarged, sectional view taken on the line 10—10 of FIG. 9;

FIG. 11 is an enlarged, sectional view of a transfer device and taken on the line 11—11 of FIG. 9;

FIG. 12 is a sectional view of the transfer apparatus and taken on the line 12—12 of FIG. 11;

FIG. 13 is a fragmentary, enlarged, side elevational view of a portion of the drive transmitting mechanism illustrated adjacent the lower left-hand end of FIG. 1; and FIG. 14 is a fragmentary view partly in top plan and partly in section of the mechanism shown in FIG. 13.

DELIVERY AND DISCHARGE CONVEYORS

Apparatus constructed in accordance with the invention is adapted for use in conjunction with a product delivery conveyor 1 (FIGS. 1 and 2) comprising an endless belt 2 or the like trained around driven rolls 3 and by means of which pans P containing dough or the like may be delivered to a loading station or zone 4. Beneath the delivery conveyor 1 is a product discharge conveyor 5 comprising an endless belt 6 trained around driven rolls 7 and adapted to receive pans P from an unloading zone or station 8.

The delivery and discharge conveyors 1 and 5, respectively, are conventional and form no part of the invention per se. It is, however, necessary that the pan supporting surfaces of the conveyors 2 and 6 be vertically spaced a predetermined distance apart, as will be pointed out in more detail hereinafter.

THE HOUSING

Apparatus constructed in accordance with the invention comprises a housing 9 composed of vertical and horizontal frame members 11 and 12, respectively, welded or otherwise suitably secured to one another to form a rigid framework 10. To the respective frame members are secured walls or panels 13 around the four sides and top of the framework to form a chamber that is closed except for an opening adjacent the conveyors 1 and 5 and through which the pans P may pass into and out of the housing.

Extending longitudinally of the housing and supported by the framework are horizontal rails 78 and 79 vertically spaced from one another. The rails 78 provide an upper run or path for racks R and the rails 79 provide a lower run or path for the racks.

THE DRIVE MECHANISM

The drive mechanism is designated generally by the reference character 14 and comprises a preferably electric motor 15 having a driving shaft 16 on which is mounted a pinion gear 17 around which is trained a sprocket chain 18 that drives a sprocket wheel 19 mounted on a shaft 10 that is supported by the framework. Also fixed to the shaft 20 is a sprocket wheel 21 which, by means of a chain 22, drives a sprocket wheel 23 mounted on a shaft 24 that is supported on a horizontal frame member 11. The motor 15 and its associated driving parts constitute the sole driving means for all of the movable parts hereinafter described.

The drive mechanism also includes a crank 26 that is fixed to the shaft 24 and to which is pivoted one end of a reciprocable conecting rod 27. The other end of the connecting rod 27 is pivoted as at 28 (FIGS. 1-3) to one end of a link 29 and to one arm 30 of a two-armed beam 31. Also pivoted to the connecting rod 27 by the pivot 28 is one end of a link 32, the other end of which is pivoted to a reciprocable bar 33 that is supported for horizontal movement on rollers 34 mounted on selected frame members 11.

The beam 30 is fixed to a rock shaft 35 which spans the width of the machine frame and is journaled in bearing supports 36 mounted on horizontal frame members 12. The central portion of the shaft 35 is enclosed within a sleeve 37 to guard against dripping of oil and the opposite ends of the sleeve 37 are supported in retainers 38 fixed to horizontal frame members 12.

Figure 2:
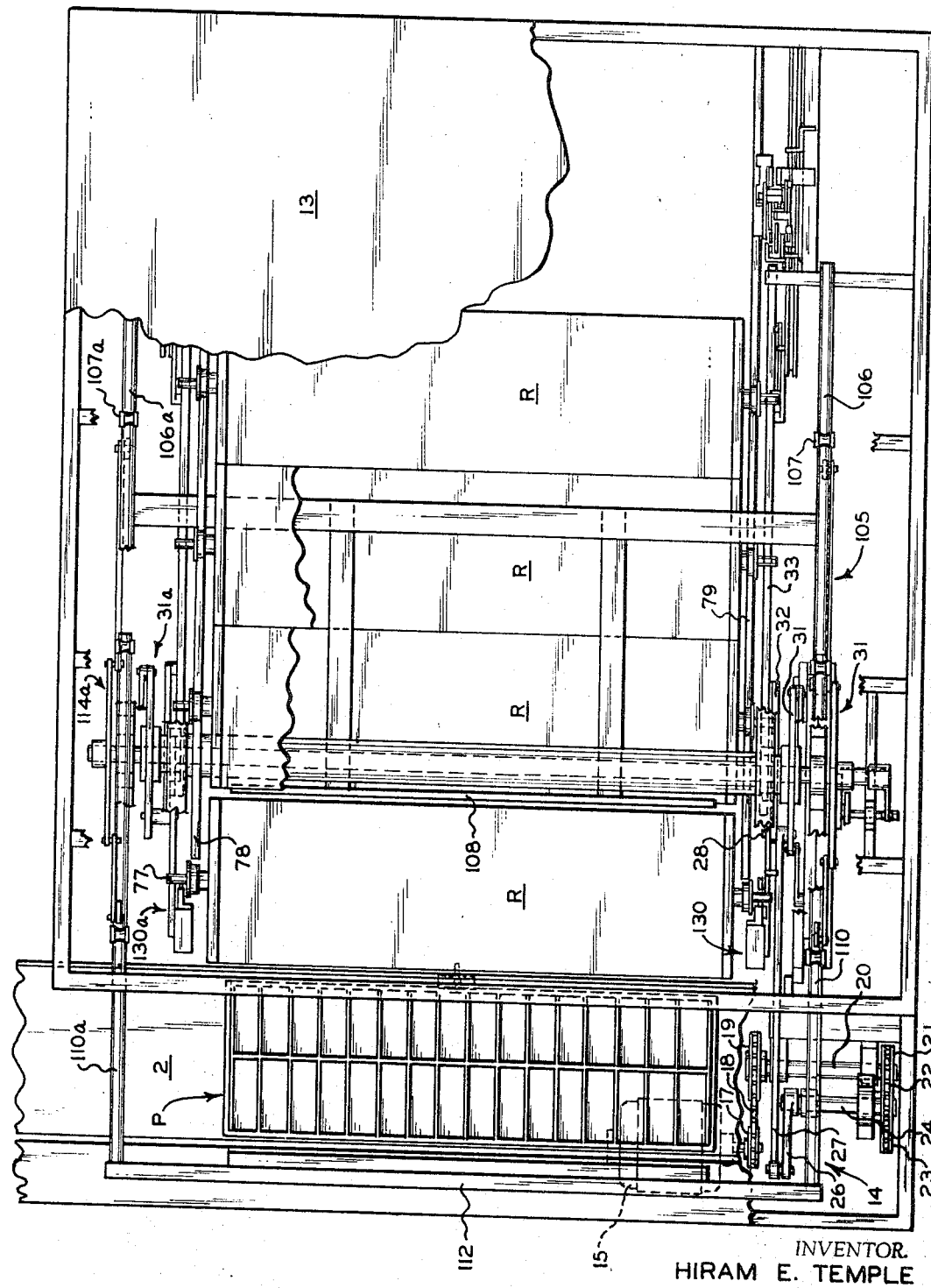
FIG. 2 is a top plan view of the apparatus shown in FIG. 1, with certain parts being broken away and other parts being shown fragmentarily for clarity.
Figure 3:
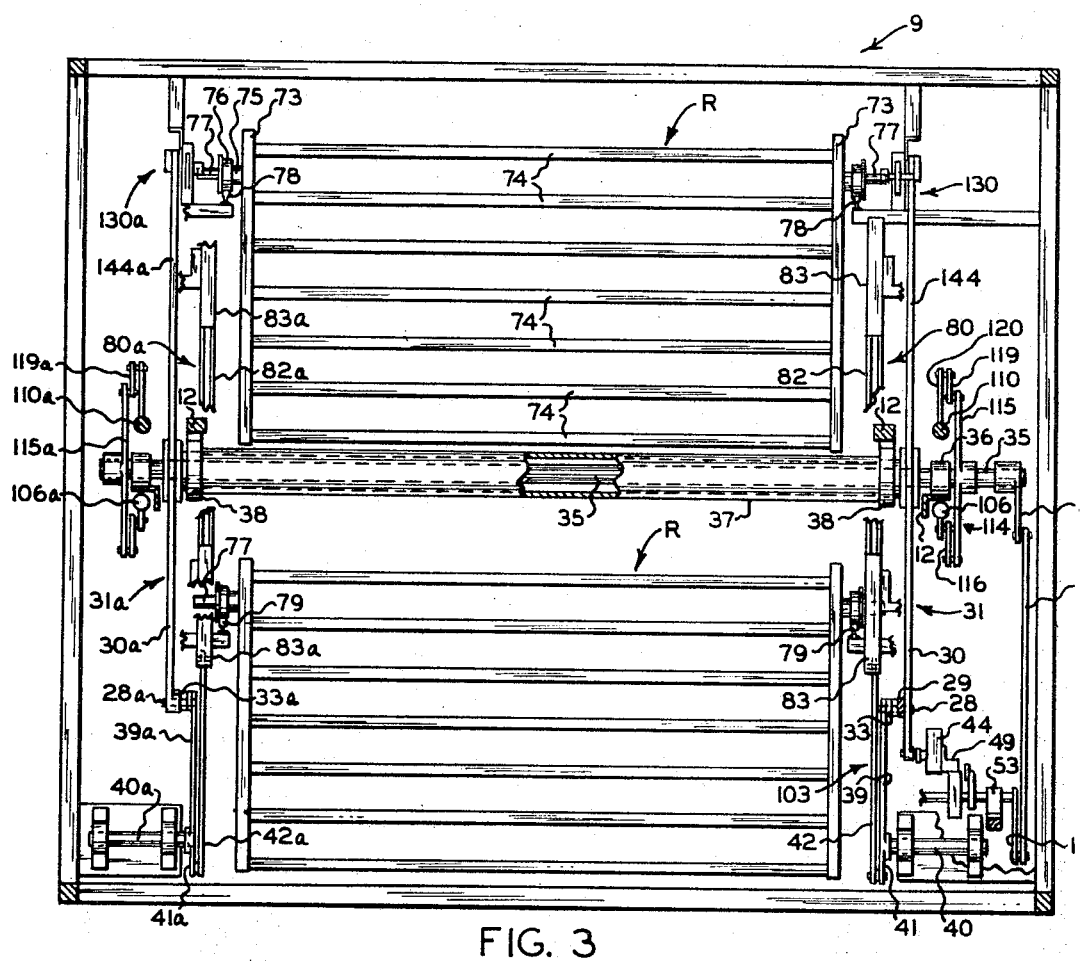
FIG. 3 is a vertical sectional view taken on the line 3—3 of FIG. 1.
Figure 4:
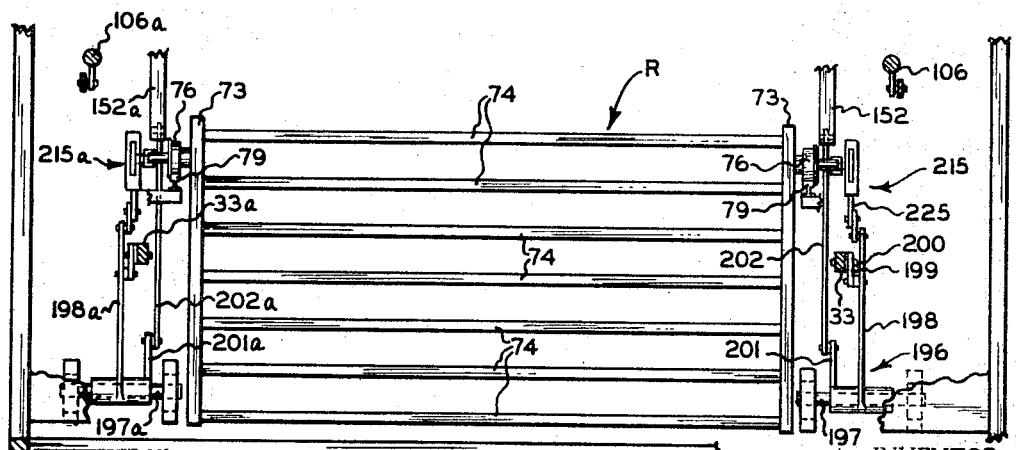
FIG. 4 is a sectional view taken on the line 4—4 of FIG. 1.

Except for the rock shaft 35 and the sleeve 37, the parts of the drive mechanism thus far described are located at one side only of the machine. The drive mechanism, however, includes parts at the other side of the machine which are similar to many of the parts hereinbefore described. Such parts are identified by similar reference characters, followed by the suffix a, and are best illustrated in FIGS. 2 and 3. It will be observed from FIG. 3 that the arm 30a of the beam 31a is not as long as the corresponding beam arm 30, but terminates at a level corresponding to the level of the pivot 28.

The construction and operation of the driving mechanism thus far described are such that operation of the motor 15 causes rotation of the crank 26 and reciprocation of the connecting rod 27. Reciprocating movement of the connecting rod 27 effects oscillation of the beams 31, 31a, reciprocation of the links 29, 29a, and reciprocation of the bars 33, 33a.

THE ARTICLE SUPPORTING RACKS

The apparatus described thus far is adapted for use with a plurality of article supporting carriers or racks designated by the reference character R. Each rack is identical and comprises a pair of spaced apart, vertical side walls 73 that are spanned by vertically spaced apart shelves 74. In the disclosed embodiment, each rack includes seven shelves, but more or fewer may be provided.

Adjacent the upper end of each side wall 73 and on the longitudinal center thereof is an outwardly extending shaft 75 on which is journaled a preferably flanged wheel 76. Each shaft 75 includes a reduced end portion 77 which projects a substantial distance beyond the wheel 76.

The wheels 76 are adapted to ride upon the rails 78 supported by the framework adjacent the upper end of the housing 10. The wheels 76 also are adapted to ride upon the rails 79 supported by the framework adjacent the lower part of the housing.

Preferably, each rack R is provided with a pair of laterally projecting guide rollers 25 (FIGS. 6 and 10) at each side for engagement with vertical guide bars on rails 25' suported by the framework. The guide members 25 and 25" stabilize the racks and avoid any tendency of the racks to swing.

THE RACK ELEVATING MECHANISM

The rack elevating mechanism is designated generally by the reference character 80 and is best illustrated in FIGS. 1, 3, 5 and 6. The rack elevating mechanism is interposed between the upper and lower runs and, at one side of the machine, comprises a reciprocable frame 81 including a vertically extending bar 82 at the upper and lower ends of which is connected a plate 83 which, in turn, is joined to a member 84. The members 82–84 form upper and lower mounting means which receive an L-shaped projection 85 fixed on the framework and on which are journaled a plurality of rollers 86 that guide the frame 81 in its vertical movements.

On the bar 82 is pivoted a plurality of rack engaging fingers or dogs 87, each of which comprises a two-arm bell crank. Each dog 87 is pivoted on the bar 82 by means of a pin 88 and includes a first arm 89 and a second arm 90. To each arm 90 is connected one end of a tension spring 91, the opposite end of which is anchored to a pin 92 mounted on the bar 81. The spring 91 normally urges the arm 89 of its associated dog 87 into a projected position, as shown in FIG. 5, and against a stop pin 93 supported on the bar 81. Each dog, however, is rotatable in a counterclockwise direction, as viewed in FIG. 5, as permitted by the spring 91.

Apparatus like that just described is provided at the opposite side of the machine and similar parts are identified by similar reference characters followed by the suffix a.

Adjacent the movable frame 81 is a fixed frame 94 comprising a vertically extending member 95 supported by the framework 10. A plurality of article supporting fingers or dogs 96 is mounted on the member 95 and in each instance comprises a first arm 97 and a second arm 98. Each dog 96 is pivoted as at 99 to its associated support member 95, and each arm 97 is urged to a projected position by a spring 100, one end of which is connected to the arm 98 and the other end of which is anchored to a pin 101 supported on the frame member 95. The extent to which the spring urges its associated arm 97 to a projected position is determined by a stop pin 102 located in the path of counterclockwise movement of the dog 96. Apparatus 94a similar to the apparatus 94 is provided at the opposite side of the machine.

Figure 6:
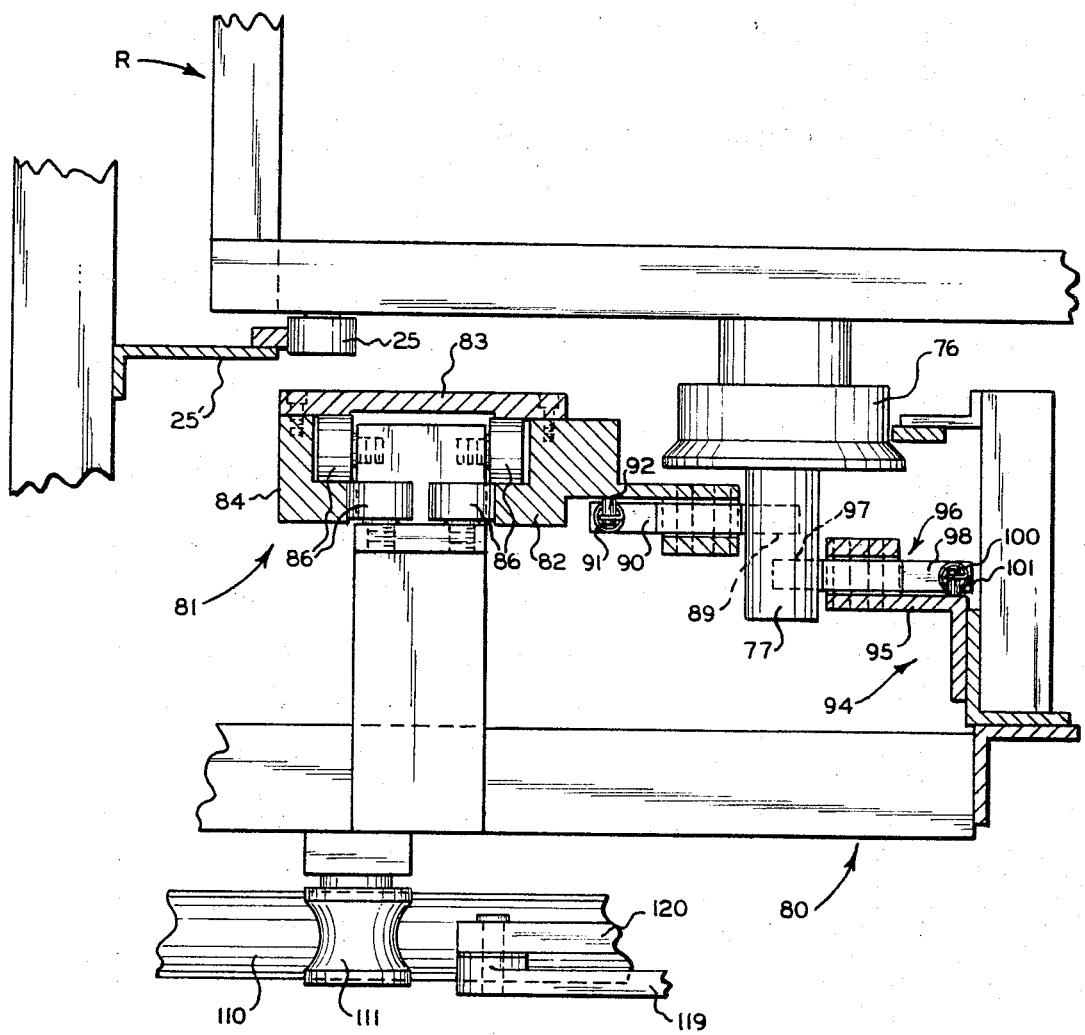
FIG. 6 is an enlarged sectional view taken on the line 6—6 of FIG. 5.

As is best shown in FIGS. 5 and 6, the ends of the respective arms 89 and 97 overlap one another. To prevent interference between the overlapping arms, the respective dogs are laterally offset from one another. The dogs 87 and 96 are equal in number, but are vertically staggered with respect to one another. The lowermost article engaging dog 87 is so mounted that in its normal or inactive position its arm 89 is located slightly above the level of the rail 79 but below the level of the shaft 77 of a rack supported on the rail. As also is apparent from FIGS. 5 and 6, the frame member 82 lies in the path of horizontal movement of each rack R to the left and forms a stop for the left-hand end of the lower run. Moreover, the spacing between the frame members 82 and 95 is such as to accommodate the shaft 77 and define a vertical path of movement therefor.

ELEVATOR OPERATING MECHANISM

The elevator operating mechanism (see FIGS. 1–3) comprises a bell crank 103 rockably mounted on a shaft 40 and having an arm 39 pivotally connected to one end of the link 29, the other end of the latter being pivoted as at 28 to the arm 30 of the beam 31 as has hereinbefore been described. The bell crank 103 has a second arm 41 that is pivoted to one end of an upstanding link 42, the other end of which is pivoted as at 104 to the lower end of the movable frame 81. Similar apparatus is provided at the opposite side of the machine and similar parts are identified by similar reference characters followed by the suffix a.

The construction of the elevator operating mechanism is such that oscillation of the beam arm 30 causes oscillation of the bell crank 103 and vertical reciprocation of the link 42 and the movable frame 81.

In the operation of the elevator apparatus, upward movement of the movable frame 81 from the position shown in FIG. 5 causes the lowermost dog 87 to engage the shaft 77 of a rack and lift the latter along the path defined by the frame members 82 and 95. The stroke of the operating mechanism is somewhat greater than the spacing between adjacent article supporting dogs 96. As the rack R is raised, the lowermost dog 96 is cammed out of the path of movement of the shaft 77, but once the shaft 77 is at a higher level than the lowermost dog 96, its spring 100 restores the latter to its projected position. At this point the direction of movement of the movable frame 81 is reversed. As the frame 81 moves downwardly, the rack shaft 77 is engaged by the lowermost dog 96 and is supported thereby. As the frame 81 continues to move downwardly, the second lowest dog 87 will be cammed by the shaft 77 from its projected position to a retracted position until such time as the movement of the frame 81 lowers the dog 87 to a position below the shaft 77. Continued reciprocation of the frame 81 will effect incremental or indexing movement of the rack R upwardly in successive increments of distance corresponding to the spacing between the rack shelves 74.

RACK UNLOADING MECHANISM

Rack unloading mechanism is indicated generally by the reference character 105 and is best illustrated in FIGS. 1, 2 and 5. The unloading apparatus comprises a pair of parallel bars 106, 106a, one located at either side of the machine, and reciprocably supported by rollers 107, 107a that are mounted on selected vertical frame members 11. The ends of the bars 106 adjacent the elevator mechanism 80 are joined to one another by a pusher bar or plate 108 which is adapted to traverse a rack shelf 74 and sweep articles therefrom to the discharge conveyor 5.

RACK LOADING MECHANISM

The rack loading mechanism is indicated generally by the reference character 109 and comprises a pair of bars 110, 110a similar to the bars 106, 106a and overlying the latter. The bars 110, 110a are reciprocably mounted in rollers 111, 111a supported from the main frame. The bars 110, 110a extend above and beyond the delivery conveyor 1 and are connected at corresponding ends by a depending pusher bar or panel 112 which is adapted to engage articles such as the pans P and transfer them from the conveyor 1 to a rack shelf.

RACK LOADING AND UNLOADING OPERATING MECHANISM

The rack loading and unloading operating mechanism is indicated generally by the reference character 113 and is best disclosed in FIGS. 1, 5, 13 and 14. The mechanism 113 includes a T-shaped lever 114 that is rockably mounted on the shaft 35. The lever 114 includes one arm 115 that is pivoted to a connecting link 116 that is pivoted on a lug 117 fixed to the bar 106. The lever 114 includes a second arm 118 that is pivoted to one end of a connecting link 119, the other end of which is pivoted to a bracket 120 mounted on the arm 110. The third arm 121 of the lever 114 is pivoted to one end of a link 122, the opposite end of which is pivoted to a crank arm 123.

The construction of the loader and unloader operating mechanism is such that rotation of the crank arm 123 effects vertical reciprocation of the link 122 and oscillation of the lever 114 so as to effect simultaneous reciprocation of the rack unloading apparatus 105 and the loading apparatus 109.

In the operation of the apparatus, articles on each successive rack shelf are pushed off the latter onto the conveyor 5 and simultaneously articles are transferred from the conveyor 1 to the next upper adjacent rack shelf following each incremental movement of a rack by the elevator mechanism.

Referring particularly to FIGS. 13 and 14, the loader and unloader operating mechanism includes a link 43 that is pivoted at the lower end to the beam arm 30 and at the other end to a horizontally reciprocable carriage 44 having rollers 45 which ride on vertically spaced rails 47 and 48 supported on vertical frame members 11 to guide the carriage in its movements. Fixed to the carriage 44 is a toothed rack 49 having teeth 50 in mesh with the teeth of a gear 51 freely mounted on a shaft 52 that is journaled adjacent one end in a self-aligning, fixed bearing 53 supported on a horizontal frame member 12. The other end of the shaft 52 is journaled in a floating bearing 54 that is mounted in a bearing guide 55 which is frictionally supported on another horizontal frame bar 12 so as to be capable of movement relative thereto.

A plate 67 is keyed on the shaft 52 and has pivoted thereto as at 68 a latch dog 69. The dog 69 has a notch 70 which receives a pin 71 that is secured to and projects laterally from the gear 51. The dog 69 normally is urged in a direction to seat the pin 71 in the notch 70 by means of a spring 72. The arrangement is such that movement of the rack 49 to the right, as viewed in FIGS. 13 and 14, by the beam arm 30 causes the gear 51 to rotate free of the plate 67 and the dog 69. Return movement of the rack 49, however, engages the pin 71 in the notch 70 of the dog 69 so as to effect one revolution of the shaft 52 and consequently rotation of the plate 67.

One revolution of the shaft 52 causes one revolution of the crank 123 and one cycle of operation of the loading and unloading mechanism. The cycle of operation of the loader and unloader mechanism is complete when the carriage 44 is in the position shown in FIG. 13. Consequently, the pusher bars of the loading and unloading mechanism are withdrawn from the rack to enable the latter to move upwardly without interference. Due to the idle rotation of the gear 51 upon movement of the carriage 44 to the right from the position shown in FIG. 13, the pusher bars remain in their retracted positions during indexing of the rack.

JAM PREVENTING MECHANISM

In order to prevent jamming of articles during their transfer to and from a rack, the spacing between the supporting surfaces of the conveyors 1 and 5 corresponds exactly to the spacing between adjacent rack shelves. To guard against sagging of the shelves of a rack, one or more toothed arms 125 (FIGS. 1 and 5) are pivoted as at 127 on brackets 126 supported on the main frame and are lightly urged in a direction toward the rack R by torsion springs surrounding the pivot pins 127. As a rack is indexed upwardly, each successive shelf cams the arms 125 out of the way until the shelf reaches a level in which it may be received in a notch 128 formed at the free end of each arm 125. The arm 125 then is restored to its rack supporting position as determined by a flange on the bracket 126, in which position it assures horizontal alignment of the rack shelves and the conveyors 1 and 5. In addition, the arms 125 stabilize the rack against any swinging movement.

DRIVE INTERRUPTING MECHANISM

If, for some reason, a jam does occur in transferring pans to or from a rack shelf, the apparatus includes means reacting between the drive mechanism 14 and the loading and unloading means for interrupting operation of the driving mechanism. The drive interrupting means is best shown in FIGS. 13 and 14 and includes the floating bearing guide 55 to which is pivoted one end of a thrust rod 56, the other end of which is pivoted to one end of a lever 57 that is pivoted as at 58 to the guide rail 47. To the other end of the lever 57 rod 59 is pivoted as at 60. One end of the rod 59 is adapted to engage and open a normally closed switch 61 that is supported on the frame and connected in the circuit of the motor 15. The other end of the rod 59 slidably receives a flanged sleeve 62 that is surrounded by a pair of washers 63 that engage opposite sides of a plate 64 that is supported on the frame. A pair of compression springs 65 surround the rod 59 and react between the washers 63 and flanged sleeves 66 that are fixed on the rod 59. The springs 65 normally center the lever 57 in such position that the switch 61 remains closed, but permit rocking movement of the lever 57 upon displacement of the bearing guide 55 to effect opening of the switch 61 and stopping of the driving motor 15. Such displacement of the guide 55 will occur if the loading or unloading devices are obstructed.

ELEVATOR TRANSFER APPARATUS

Transfer apparatus 130 is provided for transferring racks from the upper end of the elevator mechanism to the upper rails 78 for movement along the upper run of the machine. The transfer apparatus is best illustrated in FIGS. 5, 7 and 8. The apparatus 130 comprises a carriage member 131 provided with rollers 132 that support the carriage for horizontal sliding movement between upper and lower guide rails 133 and 134, respectively, that are fixed to vertical frame members 11. Pivoted to the carriage 131 on a bushing 135 is one end of an arm 136 terminating at its other end in a generally L-shaped member 137 that is adapted to overlie and engage the stub shaft 77 of a rack that has been elevated to the upper run of the machine. Fixed to the arm 136 at its pivoted end is an upstanding bar 138 to which is connected one end of a tension spring 139, the other end of the spring being anchored to a lug 140 that is fixed to the carriage 131. The spring 139 normally urges the arm 136 to rock clockwise, as viewed in FIG. 5, to position the member 137 at the level of the rack shelf 77 when the latter is at the upper run, but the spring 139 permits rocking movement of the arm 136 in a counterclockwise direction. Clockwise rocking of the arm 136 is limited by a stop 141 on the carriage 131 and which is received in a notch 142 formed in the transfer arm.

Transfer apparatus 130a similar to the transfer apparatus 130 is located at the opposite side of the machine and corresponding parts are identified by corresponding reference characters, followed by the suffix a.

ELEVATOR TRANSFER OPERATING MEANS

Apparatus for operating the elevator transfer apparatus 103 comprises an arm 144 on the beam 31 and a link 145 that is pivoted at one end to the arm 144 and at the other end to the carriage 131 by bushing 135.

Similar parts are provided at the opposite side of the machine and are identified by similar reference characters, followed by the suffix a.

In the operation of the apparatus, oscillation of the beams 31, 31a effects reciprocating movement of the transfer devices 130, 130a. The arrangement is such that rocking of the beams 31, 31a counterclockwise from the positions shown in FIGS. 1 and 5 effects movement of the transfer carriages 131, 131a to the left as the rack R is elevated to such a position as to be supported by the uppermost supporting dog 96. The arms 136, 136a may be swung upwardly by the rack shaft 77 as the carriages move to the left, but will be returned by their respective springs to their lowered positions once they are free of the shafts 77. Return movement of the beams 31, 31a will cause the members 137, 137a to engage the rack shafts 77 and push the rack along the upper rails 78 toward the far end of the upper run.

A rack being transferred to the upper run of the machine from the elevator apparatus will engage a previously transferred rack so as to effect movement of all of the racks in the upper run toward the right, as viewed in FIG. 1.

RACK LOWERATOR APPARATUS

Lowerator apparatus 150 is provided for indexing a rack from the upper run of the machine to its lower run and is best illustrated in FIGS. 1, 9, 9A and 10. The lowerator apparatus comprises a vertically reciprocable frame 151 comprising an elongated member 152 spanning the distance between the upper and lower runs and having upper and lower guides 153 and 154 on which ride rollers 155 that are journaled on bracket members 156 supported on the main frame. Fixed to the member 152 is an elongated strap 157 and between the latter and the member 152 is pivoted a plurality of vertically spaced article supporting dogs 158. Each dog 158 comprises a bell crank pivoted by means of a pin 159 between its two arms 160 and 161. Each arm 160 terminates in an upstanding ear 162 that is adapted to engage a stop pin 163 spanning the space between the members 152 and 157.

Fixed to the main frame adjacent the movable frame 151 is a stationary frame member 165 and to which is fixed a strap 166. Between the strap and the member 165 is pivoted a plurality of article supporting dogs or fingers 167, each of which includes two arms 168 and 169. Each dog 167 is pivoted by means of a pin 170 located between the arms 168 and 169. The free end of each arm 168 terminates in an upstanding ear 171 that is adapted to engage a stop pin 172 which spans the distance between the members 165 and 166.

The dogs 158 and 167 are uniformly spaced but are vertically staggered, as is best shown in FIG. 9. The dogs also are laterally spaced so as to avoid engaging each other. The frame members 151 and 165 are spaced apart from one another a distance sufficient to accommodate the rack stub shafts 77 and define a vertical path therefor.

Each of the sets of dogs 158 and 167 is adapted to be moved from a projected position in the path of movement of a rack to a retracted position out of the path of the rack. Means for effecting such movements of the dogs 158 comprises a bar 174 that is pivoted to each of the dog arms 161 and is supported thereby. Mounted on the bar 174 is a roller 175 that bears against one arm 176 of a bell crank 178 that is pivoted as at 177 on a block 179 that is supported on the member 174. A second arm 180 of the bell crank 178 carries a roller 181 at its free end which rides against a cam 182 having a vertical surface 183 and an inclined cam surface 184. The cam 182 is supported on the main frame.

Means for moving the dogs 167 from their projected positions to their retracted positions comprises a vertical bar 185 that is pivoted to the arm 169 of each dog 167 and supported thereby. The bar 185 is provided with a lug 186 on which is mounted a roller 187 that bears against one arm 188 of a bell crank 189 pivoted on the fixed frame member 165. The bell crank 189 includes a second arm 190 having a roller 191 at its free end that is adapted to be engaged by a cam block 192 fixed on the movable frame member 157 and having an inclined cam surface 193 and a vertical surface 194.

When the Lowerator apparatus is in its normal, inactive position and in readiness to receive a rack from the upper run of the machine, the movable frame 151 is in an elevated position with the cam follower 181 engaging the vertical cam surface 183 of the cam block 182. In these positions of the parts, the bar 174 is elevated and maintains each of the dog arms 160 is a projected position, as is indicated in FIG. 9. The cam follower 191 of the bell crank 189, however, is free of the cam block 192, thereby enabling the bar 185 to hold, by gravity, the dogs 167 in such positions that their arms 168 are retracted, as is shown in FIG. 9.

When the movable frame 151 moves toward its lowered position, the cam 192 will engage the cam follower 191 and rock the bell crank 189 clockwise, as viewed in FIG. 9, so as to move the actuating bar 185 vertically, thereby projecting the dog arms 168 into the path of the rack shaft 77. Downward movement of the movable frame 151 also will effect disengagement between the cam 182 and the bell crank 178 so as to permit downward movement of the actuating rod 174 and retraction of the dog arms 160 from the path of the rack shaft 77. See FIG. 9A.

Upward movement of the movable frame 151 will effect restoration of the article engaging dogs 158 to their projected positions and restoration of the article supporting dogs 167 to their retracted positions.

Apparatus like that described above is provided at the opposite side of the machine and similar parts are identified by similar reference characters, followed by the suffix a.

LOWERATOR OPERATING MECHANISM

The Lowerator operating mechanism 195 comprises a bell crank 196 journaled on a shaft 197 supported on the main frame and having one of its arms 198 pivoted to one end of a link 199, the other end of which is pivoted as at 200 to the reciprocating bar 33. The bell crank 196 has a second arm 201 that is pivoted to one end of an operating link 202, the other end of which is pivoted to the lower end of the movable frame member 152. Reciprocation of the bar 33 effects oscillation of the bell crank 196 and vertical reciprocation of the movable frame 151.

Similar apparatus is provided at the opposite side of the machine.

TRANSFER OF RACKS TO LOWERATOR

The machine preferably includes means 203 (FIGS. 9, 9A) for assisting in the transfer of racks from the upper run to the Lowerator. The transfer means 203 comprises a bell crank 204 pivoted at 205 on an ear 206 that is supported on a frame member 12. The bell crank includes an arm 207 on which is journaled a roller 208 that is adapted to be engaged by an extension 209 of the member 152. The bell crank includes a second arm 210 to which is connected one end of a tension spring 211, the opposite end of the latter being anchored to an ear 212 fixed to a frame member 12. The bell crank normally is held by the spring 211 in the position indicated in FIG. 9A with the arm 210 against a stop 213. In this position of the bell crank, sufficient clearance is provided between the rail 78 and the free end of the arm 210 to permit the rack to pass beneath the bell crank without interference between the arm 210 and the stub shaft 77. When the movable frame 151 is in its elevated position, however, the extension 209 engages the roller 208 and rocks the bell crank counterclockwise, as viewed in FIG. 9, so as to cause the arm 210 to bear agains the rack stub shaft 77 and move the rack toward to right until the shaft 77 bears against the confronting surface of the members 152 and 157. As the movable frame 151 moves to a lowered position, the spring 211 returns the bell crank 204 to its inactive position.

Similar apparatus is provided at the opposite side of the machine.

TRANSFER OF RACKS FROM THE LOWERATOR

Means 215 is provided for transferring racks from the Lowerator and for effecting movement of the racks along the lower run. The transfer apparatus 215 is best shown in FIGS. 1, 9, 11 and 12 and comprises a carriage 216 provided with rollers 217 that ride upon upper and lower guide rails 218 and 219, respectively, to guide the carriage in its movements. Pivoted at 220 to the carriage 216 is an arm 221 at the free end of which is a generally L-shaped pusher member 222 that is adapted to engage the shaft 77 of a rack R. Fixed on the arm 221 is a lug 223 to which one end of a spring 224 is connected. The other end of the spring is anchored to a plate 225 that is fixed to the carriage 216. The spring 224 constantly urges the arm 221 to rock in a clockwise direction, as viewed in FIG. 9, so as to locate the member 22 in a position to engage the shaft 77. The arm 21 is movably maintained in such position by a stop 226 that is carried by the carriage 216 and adapted to be received in a notch 227 formed in the arm 221.

The arm 221 is rockable about the pivot 220 in a counterclockwise direction, as viewed in FIG. 9, so as to permit the members 221 and 222 to be cammed out of the path of a rack shaft 77 upon movement of the carriage 216 to the right from the position shown in FIG. 9. After the arm 221 has been moved to the right of a shaft 77, however, the spring 224 restores the arm to a raised position in which the member 222 may engage a shaft 77.

Similar transfer apparatus 215a is provided at the opposite side of the machine.

TRANSFER APPARATUS OPERATING MEANS

Means 228 (FIG. 1) is provided for operating the transfer mechanism 215 and comprises a link 229 that is pivoted at one end to the bell crank arm 198 and at its other end to the plate 225. As the rod 33 is reciprocated by the crank 26, the bell crank 196 is oscillated and the carriage 216 is reciprocated. The length of the stroke of the carriage 216 is such as to move the member 222 to the right from the position shown in FIG. 1 a distance sufficient to locate the member 222 to the right of a rack shaft 77 being discharged from the Lowerator 150.

OPERATION

To condition the apparatus for operation, a plurality of racks R will be introduced to the machine and arranged on the upper and lower runs in face-to-face engagement. An additional number of racks may be included and disposed on the elevator or Lowerator mechanism. The number of racks that may be accommodated by the machine will vary according to the size of the latter, but it is necessary that there be a sufficient number of racks that transfer of a rack from the elevator toward the Lowerator will effect movement of a rack from the upper run to the Lowerator. It also is necessary that the number of racks be such that transfer of a rack from the Lowerator to the lower run of the machine effects movement of a rack from the lower run to the lower end of the elevator.

When a sufficient number of racks has been introduced to the machine, the motor 15 may be started and operated continuously so as to constantly rotate the driving crank 26. A rack introduced to the lower end of the elevator will be indexed upwardly step by step past the unloadnig station 8 and the loading station 4. As each shelf is positioned at the unloading station 8 the next higher shelf will be positioned at the loading station 4. At this time, the loading and unloading mechanism will be operated so as simultaneously to discharge articles from the lower rack shelf to the conveyor 5 and to transfer articles from the conveyor 1 to the next higher shelf.

Such incremental elevating of the rack continues until the bottom shelf is loaded from the conveyor 1, at which time the transfer mechanism 130 will engage the shaft 77 and push the loaded rack along the upper run toward the Lowerator. Such movement of the loaded rack will cause the rack at the far end of the upper run to be introduced to the Lowerator 150.

The rack in the Lowerator will be indexed or lowered incrementally until such time as it reaches the level of the lower run. At this time the transfer apparatus 215 will engage the rack shaft 77 and push the latter to the left or toward the elevator. Such movement of the rack will advance the racks on the lower run so as to introduce the endmost rack to the elevator. The process then is repeated for each of the remaining racks.

The construction of the apparatus is such that one driving motor effects the operations of all parts of the apparatus, thereby dispensing with multiple driving units and complex synchronizing devices. Moreover, except for the driving chains associated with the motor 15, no other chains are required. Furthermore, the utilization of links and levers to effect movements of the racks and the transfer of articles to and from the racks enables the movement of the racks and articles to begin slowly and end slowly, thereby minimizing starting and stopping shocks.

The disclosed embodiment is representative of a presently preferred form of the invention but is intended to be illustrative, rather than definitive. The invention is defined in the claims.

I claim:

1. In bakery product treating apparatus: a plurality of rack carriers, each having vertically spaced surfaces for supporting bakery products; means forming a conveyor circuit for said carriers including longitudinally spaced, generally vertically extending run portions connected by upper and lower run portions; a loading support surface and an unloading support surface adjacent one of the vertically extending run portions; drive motor means; and carrier movement controlling means driven continuously by said motor means for moving said carriers along said one run portion in incremental steps with a dwell between increments of vertical movement, said means including: a series of vertically spaced support stations having support surfaces forming said one run portion; said support station surfaces being vertically spaced apart a distance substantially corresponding to the vertical spacing of said support surfaces on the carriers; means on said carriers by which said carriers are supported at successive support stations; means for transferring said carriers between said vertically extending run portions and upper and lower run portions; vertically oscillating lift member means having spaced apart lift support surfaces thereon spaced vertically apart a distance substantially corresponding to the vertical spacing of said support surfaces on the carriers for moving the carriers vertically from one support station surface to another in intermittent movements so that said carriers are moved around said circuit; means connecting said drive motor means and lift member means for oscillating said lift member means in a path to move a carrier from a position on one support station to a position to deposit it on the support station immediately adjacent it and thence to return to position; and means for loading products to said carrier surfaces from said loading support surface and unloading them from said carrier surfaces to said unloading support surface while said lift member means is returning.

2. The combination defined in claim 1 in which said support stations are movable between extended and withdrawn positions.

3. The combination defined in claim 2 in which the support stations are pivotally mounted and those on the vertical run portion and lift member means are in laterally overlying relation in extended position.

4. The combination defined in claim 1 wherein said series of support stations forms an elevator run portion and a lowerator run portion also includes a series of vertically spaced, extendable and withdrawable support stations; transfer means having a down stroke for moving the carriers vertically from one lowerator support station surface to another is provided; and cam operated means is also provided connecting said lowerator support stations for extending and withdrawing movement in unison.

5. The combination defined in claim 4 in which pivotal arm means having a notched outer end for engaging under a carrier support surface is mounted at said elevator run portion and is movable from a position out of the path of said carriers down to engage under the carrier surfaces to restore any sag thereof.

6. In bakery product treating apparatus: a plurality of rack carriers, each having vertically spaced surfaces for supporting bakery products; means forming a conveyor circuit for said carriers including longitudinally spaced, generally vertically extending run portions connected by upper and lower run portions; said means including a series of vertically spaced support stations having support surfaces forming a vertically extending lowerator run portion and means forming a vertically extending elevator run portion; means mounting said support stations for movement between extended and withdrawn positions; means on said carriers by which said carriers are supported at successive support stations; transfer means having a downstroke for moving the carriers vertically from one support station surface downwardly to another so that said carriers are lowered along said lowerator run portion and an up stroke for returning to position; means connecting support stations for movement in unison; and means operable to actuate said station connecting means and move the support stations to extended position to receive the carriers from said transfer means.

7. The combination defined in claim 6 in which said means connecting said support stations comprises a vertical member; and said means operable to move it comprises cam means holding said vertical member up against the force of gravity until the transfer means is near the end of its down stroke.

8. In bakery product treating apparatus: a plurality of rack carriers, each having vertically spaced surfaces for supporting bakery products; means forming a conveyor circuit for said carriers including longitudinally spaced, generally vertically extending run portions connected by upper and lower run portions; said means including a first series of vertically spaced support stations having support surfaces forming a vertically extending lowerator run portion and means forming a vertically extending elevator run portion; means on said carriers by which said carriers are supported at successive support stations; transfer means having a down stroke for moving the carriers vertically from one support station surface downwardly to another so that said carriers are lowered along said lowerator run portion and an up stroke for returning to position; said transfer means having a second series of vertically spaced support stations mounted for movement between extended and withdrawn positions; means connecting said second series of support stations for movement in unison; and means operable to actuate said station connecting means and move the support stations to extended position to receive the carriers from said upper run portion of the circuit.

9. The combination defined in claim 8 in which said means connecting said support stations comprises a vertical member; and said means operable to move it comprises cam means on said transfer means operable to actuate said station connecting means when the transfer means is near the end of its down stroke.

10. In bakery product treating apparatus: a plurality of rack carriers, each having vertically spaced surfaces for supporting bakery products; means forming a conveyor circuit for said carriers including longitudinally spaced, generally vertically extending elevator and lowerator run portions connected by upper and lower run portions; a loading support surface and an unloading support surface adjacent one of said vertically extending run portions; means on said carriers by which said carriers are supported during travel on said run portions; means driving said vertically extending run portion adjacent said loading support surface and unloading support surface in vertical incremental movements having dwells between them; transfer means for loading products between said loading and unloading support surfaces and carrier support surfaces during said dwells; and swingable arm means having outer ends shaped to engage under each carrier surface and restore any sagged condition; said arm means being swingable from a position out of the path of said carrier surfaces to a position in engagement therewith; and means normally urging said arm means to engaged position.

11. The combination defined in claim 10 in which said swingable arm means is mounted at the elevator run portion and has a notch at its outer end for engaging under a carrier surface.

12. In bakery product treating apparatus: a plurality of rack carriers, each having vertically spaced surfaces for supporting bakery products; means forming a conveyor circuit for said carriers including longitudinally spaced, generally vertically extending run portions connected by upper and lower run portions; said means including a first support stations means having a series of vertically spaced support surfaces forming a vertically extending elevator run portion and a second support station means having a series of vertically spaced support surfaces forming a vertically extending lowerator run portion; conveyor support surface means adjacent said elevator run portion; transfer means for moving products between the support surfaces of said carriers and said conveyor support surface means; means permitting transfer of said carriers between said elevator and lowerator run portions and upper and lower run portions; reciprocating bar means at each vertically extending run portion for engaging a carries and moving it vertically from one support station surface to another so that said carriers are moved around said circuit; longitudinally movable transmission bar means extending longitudinally between the elevator run portion and lowerator run portion; link means connecting the ends of the reciprocating bar means with the ends of the transmission bar means; and means driving said transmission bar means.

References Cited

UNITED STATES PATENTS

| | | | |
|---|---|---|---|
| 624,826 | 5/1899 | Krone | 198—225 X |
| 1,158,161 | 10/1915 | Bean et al. | 198—225 X |
| 1,846,258 | 2/1932 | Johnson et al. | 198—85 |
| 2,371,140 | 3/1945 | Alling et al. | 198—232 X |
| 2,591,673 | 4/1952 | Chadwick et al. | 198—225 |
| 2,864,515 | 12/1958 | Marshall | 214—16.1 |
| 2,899,040 | 8/1959 | Smith et al. | 214—16.4 X |
| 3,266,616 | 8/1966 | Thomas et al. | 214—16.4 X |
| 3,319,806 | 5/1967 | Temple | 214—16.4 |

FOREIGN PATENTS 524,099   7/1940   Great Britain.

EVON C. BLUNK, Primary Examiner

A. N. GOODMAN, Assistant Examiner

U.S. Cl. X.R.

198—85